(12) United States Patent
Tanaka et al.

(10) Patent No.: US 6,742,938 B2
(45) Date of Patent: Jun. 1, 2004

(54) OPTICAL MODULE FOR COUPLING AN OPTICAL SEMICONDUCTOR ELEMENT HAVING A SEALING CAP WITH AN OPTICAL FIBER

(75) Inventors: Hiroyuki Tanaka, Osaka (JP); Hideki Hashizume, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/909,835

(22) Filed: Jul. 23, 2001

(65) Prior Publication Data
US 2002/0028050 A1 Mar. 7, 2002

(30) Foreign Application Priority Data
Jul. 25, 2000 (JP) ........................ 2000-223328

(51) Int. Cl.[7] ................................. G02B 6/42
(52) U.S. Cl. ..................... 385/94; 385/89; 385/93
(58) Field of Search ...................... 385/88–94

(56) References Cited

U.S. PATENT DOCUMENTS

| | | | | |
|---|---|---|---|---|
| 3,950,075 A | * | 4/1976 | Cook et al. | 385/93 |
| 4,737,008 A | * | 4/1988 | Ohyama et al. | 385/93 |
| 5,189,716 A | * | 2/1993 | Matsubara et al. | 385/93 |
| 5,278,929 A | * | 1/1994 | Tanisawa et al. | 385/93 |
| 5,333,224 A | * | 7/1994 | Kikuchi | 385/93 |
| 5,337,398 A | * | 8/1994 | Benzoni et al. | 385/90 |
| 5,347,604 A | * | 9/1994 | Go et al. | 385/92 |
| RE34,790 E | * | 11/1994 | Musk | 385/93 |
| 5,388,171 A | * | 2/1995 | Michikoshi et al. | 385/36 |
| 5,452,389 A | * | 9/1995 | Tonai et al. | 385/92 |
| 5,522,001 A | * | 5/1996 | Meadowcroft | 385/88 |
| 5,533,159 A | * | 7/1996 | Okochi et al. | 385/93 |
| 5,537,503 A | * | 7/1996 | Tojo et al. | 385/93 |
| 5,546,212 A | * | 8/1996 | Kunikane et al. | 359/163 |
| 5,546,490 A | * | 8/1996 | Kikuchi et al. | 385/93 |
| 5,588,081 A | * | 12/1996 | Takahashi | 385/93 |
| 5,631,992 A | * | 5/1997 | Takahashi et al. | 385/94 |
| 5,692,083 A | * | 11/1997 | Bennett | 385/88 |
| 5,737,465 A | * | 4/1998 | Okochi | 385/88 |
| 5,751,877 A | * | 5/1998 | Ishizaka et al. | 385/93 |
| 5,841,924 A | * | 11/1998 | Mugiya et al. | 385/93 |
| 6,113,284 A | * | 9/2000 | Wu et al. | 385/92 |
| 6,120,191 A | * | 9/2000 | Asakura et al. | 385/93 |
| 6,302,596 B1 | * | 10/2001 | Cohen et al. | 385/93 |
| 6,312,167 B1 | * | 11/2001 | Kim et al. | 385/89 |
| 6,354,747 B1 | * | 3/2002 | Irie et al. | 385/88 |
| 2003/0012496 A1 | * | 1/2003 | Yamagata et al. | 385/33 |

FOREIGN PATENT DOCUMENTS

EP      0 887 865      6/1997

* cited by examiner

*Primary Examiner*—John D. Lee
(74) *Attorney, Agent, or Firm*—Whitham, Curtis & Christofferson, P.C.

(57) ABSTRACT

An optical semiconductor element (14) of the cap sealing type is aligned with an optical axis of an optical part contained in a resin housing (12), and mounted on the resin housing. In this case, the upper surface of a cap of the optical semiconductor element is butted to the end face of the housing, and bonded to the latter (by ultraviolet curing adhesive 20). In the optical module body having such a structure, the surface of the cap of the optical semiconductor element and at least a part of the side surface of the housing may be covered with a casing, and a clearance formed therebetween may be sealed with resin.

11 Claims, 4 Drawing Sheets

OPTICAL MODULE FOR COUPLING AN OPTICAL SEMICONDUCTOR ELEMENT HAVING A SEALING CAP WITH AN OPTICAL FIBER

BACKGROUND OF THE INVENTION

The present invention relates to an optical module having a reduced diameter structure in which an optical semiconductor element of the cap sealing type is butted and joined to a housing containing an optical part in a state that an optical optimal position relation holds therebetween.

An optical module is a device in which an optical semiconductor element (such as a semiconductor light emitting device, e.g., a laser diode or a semiconductor light receiving (detecting) device, e.g., a photo diode) and an optical part (such as a lens and an optical fiber ferule) are held while being aligned with each other. An array module (an optical module unit) is also available, in which a plurality of such optical modules are arrayed.

An optical module used in the optical communications field includes, for example, an optical semiconductor element (an optical semiconductor device), a lens, and a housing which holds the optical semiconductor element and the lens, and fittingly receives a ferule of an optical plug of a mating connecting member. When the optical plug is connected thereto, the optical semiconductor element is optically coupled with the optical fiber of the ferule through the lens. The optical coupling to the optical fiber is usually based on a mechanical structure constructed according to the standard on various optical connectors.

A spherical lens is widely used for the lens assembled into the optical module for the following reasons. It is manufactured highly accurately by only machining work. This results in cost reduction of the product. Further, it has no directivity. Because of this, in assembling the lens, there is no need for its orientation adjustment, and hence the assembling work is easy. An aspherical lens, a gradient index rod lens or the like is also used for the lens of the optical module. A metallic housing was widely used for the housing for holding the optical semiconductor element and the lens. In recent days, a resin housing is frequently used for the same for the following reasons. The resin housing allows the lens to be put thereinto by insert molding. Alternatively, the lens can be held with a plurality of pawl-like protruded pieces. Accordingly, the manufacturing is smooth and easy, and the cost to manufacture is reduced. The optical semiconductor element widely used is of the so-called cap sealing structure type in which an element body is sealingly mounted within a cap having a window.

In the usual manufacturing of the optical module, the optical semiconductor element, the lens and the optical fiber are aligned with one another in an optically optimal position relationship, and then the optical semiconductor element is fastened to the housing containing the lens. In a case where the optical semiconductor element is a laser diode, the laser diode is driven to emit laser light, the laser light is input to the optical fiber, and the laser light emitted from the optical fiber is monitored. At a position where the outgoing laser light is maximized in intensity, the optical semiconductor element is fastened to the housing.

In the optical module using the optical semiconductor element of the cap sealing type, the housing is designed so that the cap of the optical semiconductor element is insertable into the housing, and accordingly, the stem part of the optical semiconductor element is joined to the end face of the housing. In a case where the housing is made of resin, any of various types of adhesives may be used for the bonding, and where it is made of a metallic material, the YAG welding is often used for the bonding. In either case, those are joined together in a state that the side surface of the cap of the optical semiconductor element is entirely covered with a part of the housing.

Recently, with increase of optical communications capacity, the need of mounting the optical fibers at high density increases in the optical transmission device and the like. Accordingly, further size reduction of the optical module mounted thereon is also required. Specifically, the market demands the development of the optical module which is adaptable for the LC, MU and other types of small optical connectors, while the conventional optical module is satisfactory if it is adaptable for the SC type connector.

In the optical module using the optical semiconductor element of the cap sealing type, the outer diameter of the optical module is inherently larger than the diameter of the stem part of the optical semiconductor element. In this respect, limitation is put on the size and diameter reduction of the optical module.

SUMMARY OF THE INVENTION

Accordingly, an object of the present invention is to provide a small optical module.

Another object of the invention is to provide an optical module which is adaptable for the small optical connectors of the LC, MU and the like type.

Yet another object of the invention is to provide a small optical module which is readily applied to the optical module of the tablet type or the like.

According to an aspect of the present invention, there is provided an optical module in which an optical semiconductor element of the cap sealing type is mounted on a housing to be aligned with an optical axis of an optical part contained in the housing. The optical module is characterized in that the upper surface of a cap of the optical semiconductor element is bonded to the end face of the housing. With such a construction, the maximum outer diameter of the optical module can be within the maximum outer diameter of the optical semiconductor element.

Examples of the optical parts contained within the housing include a lens and an optical fiber ferule. The optical part contained within the housing may be not only a single optical part but also a plurality of optical parts. The housing may be structured to contain only the lens. The housing may have a structure for fittingly receiving a ferule of an optical plug of a mating connecting member, in addition to the lens built-in structure. In the latter case, the cap sealing type optical semiconductor element is aligned with the optical axes of the lens and the ferule, and then fixedly mounted on the housing. The present invention may be applied to the optical module of the type in which the optical semiconductor element is directly bonded to the ferule bore. Usually, the housing is made of synthetic resin. Ultraviolet curing adhesive is preferably used for joining the upper surface of the cap of the optical semiconductor element to the housing. Any other suitable adhesive may be used for the joining, as a matter of course.

In the optical module, the surface of the cap of the optical semiconductor element and at least a part of the side surface of the housing may be covered with a casing, and a clearance formed therebetween may be sealed with resin. In the optical module thus structured, it is preferable that the upper surface of the cap of the optical semiconductor element and the end face of the housing are bonded by ultraviolet curing adhesive, and a clearance between the inner surface of the casing, and the side surface of the cap of the optical semiconductor element and at least a part of side surface of the housing is sealed with thermosetting resin. Accordingly, the time taken for the bonding operation using the ultraviolet curing adhesive is extremely short. As a result, the coupling work of the optical optimal position is easy. With the sealing using the thermosetting resin, the bonding strength and the anti-weatherability are improved.

According to another aspect, there is provided an optical module wherein a plurality of optical modules constructed as described above are arrayed in juxtaposition and covered with a single casing, and a clearance formed therebetween is sealed with resin. A typical example of such is an optical module of the tablet type in which semiconductor light emitting elements and semiconductor light receiving elements are formed as sets in a single unit.

DESCRIPTION OF THE PREFERRED EMBODIMENT

Figure 1:
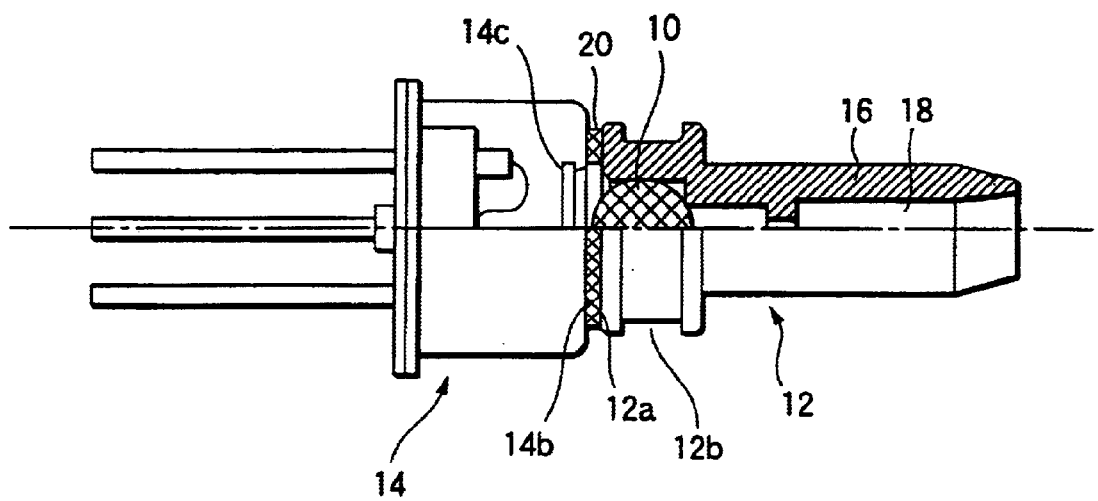
FIG. 1 is an explanatory diagram for explaining an embodiment of an optical module according to the present invention.

FIG. 1 is an explanatory diagram for explaining an embodiment of an optical module according to the present invention. The optical module is designed according to the LC or MU type standardized by IEC (International Electrotechnical Commission) As shown, in the optical module, an optical semiconductor element (an optical semiconductor device, e.g., a laser diode) 14 is joined to a resin housing 12. The resin housing 12 contains a spherical lens 10 and is adapted to fittingly hold a ferule (not shown) of an optical plug of a mating connecting member. The optical semiconductor element 14 is constructed such that a semiconductor element body is hermetically sealed with a cap whose top has a window. In the joining work, the alignment of the optical axes is performed so that the optical semiconductor element 14 is optically coupled with an optical fiber of the ferule by the spherical lens 10 when the optical plug is connected thereto.

The resin housing 12 is a one-piece molded product tubular in shape as a whole, One or first end face 12a of the resin housing 12 serves as a mounting surface on which the optical semiconductor element 14 is mounted; an inner part of the first end thereof serves as a spherical-lens fixing part; and the other or second end thereof serves as a receptacle part 16. A groove 12b is formed in and along the entire circumferential surface of the spherical-lens fixing part. The receptacle part 16 is a part having a bore (concavity) 18 into which the ferule of the optical plug of the mating connecting member is fitted. In this example, the inner diameter of the bore 18 for receiving the ferule is 1.25 mm.

The spherical-lens fixing part has a structure that the spherical lens 10 is fastened thereto by snap-in press fitting, bonding, welding or the like. In a case where the spherical-lens fixing part has the snap-in press fitting structure, a plurality of pawl-like protruded pieces are arranged around the center axis in a state that their tips are protruded toward the optical semiconductor element and overhang to the inner peripheral side. Those pawl-like protruded pieces and the resin housing body are formed in a unit form by injection process. In press fitting the spherical lens, the pawl-like protruded pieces are bent outward because of a toughness of the resin, and receive the spherical lens therein. The spherical lens then is placed on the lens seat and positioned there in place. In this state, the pawl-like protruded pieces will return to their original positions, so that the spherical lens is firmly held therewith by their restoring reaction forces.

The optical semiconductor element 14 is mounted on the resin housing 12 thus containing the spherical lens 10 therein. The upper surface (the outer peripheral part of a window 14a) 14b of the optical semiconductor element 14 is butted to the end face 12a of the resin housing 12, and finally it is aligned and set at the optical optimal position, and in this state is bonded and secured.

In the embodiment, an ultraviolet curing adhesive (an ultraviolet curable adhesive) 20 is used for the bonding. To avoid the thermal damage of the optical semiconductor element, it is necessary to bond the upper surface of the cap of the optical semiconductor element to the end face of the housing at the lowest temperature as circumstances allow. After the optical aligning, it is preferable to fix them for a short time. The bonding using the ultraviolet curing adhesive is preferable since it satisfies such a condition. By the bonding, it is possible to secure a mechanical strength (tensile strength=19.6N or higher) high enough to endure the handling of them in the post-process.

Figures 2A, 2B:
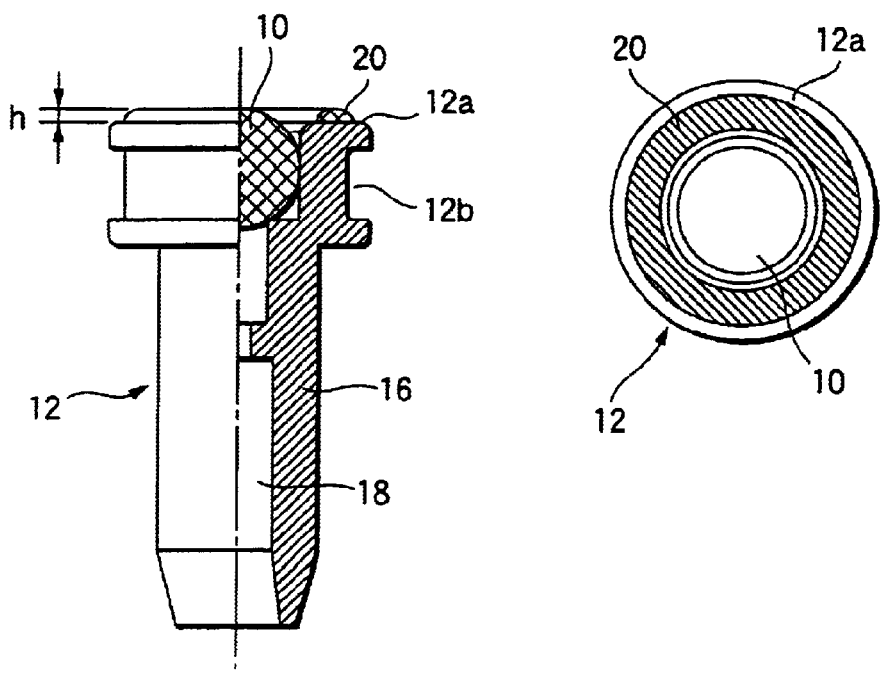
FIGS. 2A and 2B are diagrams showing a coating state in which a resin housing is coated with an ultraviolet curing adhesive.

A coating state in which the resin housing is coated with an ultraviolet curing adhesive is shown in FIG. 2. FIG. 2A is a partially sectional view showing of the resin housing, and FIG. 2B is a plan view of the sate. The resin housing 12 is set such that its end face is directed upward (the end face to be joined to the optical semiconductor element is directed upward). The end face 12a of it is circumferentially coated with a ultraviolet curing adhesive (white, opaque, Tg=100° C.) 20 whose viscosity is about 45 Pa·s by use of an automatic or manual rotary coating machine. A height of the coating of the adhesive is about 0.1 to 0.25 mm.

Figure 3:
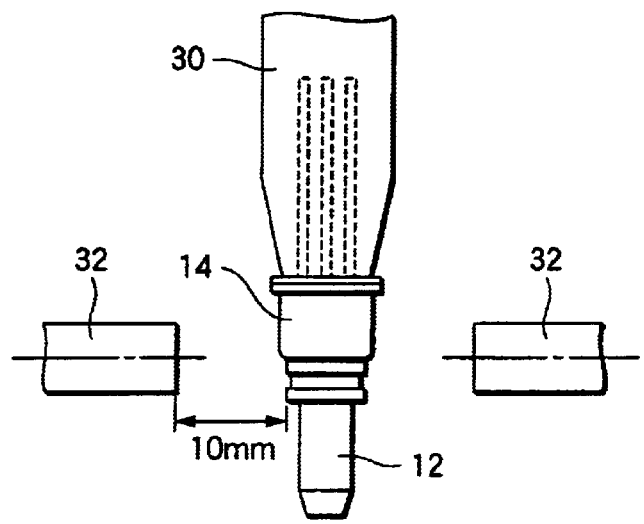
FIG. 3 is a diagram showing a bonding operation.

FIG. 3 is a diagram showing a specific bonding operation. As shown in FIG. 2, the resin housing 12 is fixed to a fixing stage (not shown) such that its surface coated with the ultraviolet curing adhesive 20 faces upward. The optical semiconductor element 14 (laser diode) is held with an element holding tool 30 in a state that the upper surface (having the window) of the cap is directed downward. Then, the optical alignment of the optical semiconductor element is carried out in a state that a clearance of 50 to 25 $\mu$m is present between the end face of the resin housing and the cap upper surface. To the optical alignment, a laser beam is emitted from the optical semiconductor element (laser diode) 14, an outgoing light from an optical fiber (not shown) of the ferule of the optical plug is monitored, and the mounting position of it is adjusted so that the outgoing light is maximized in intensity.

After its optimal position is obtained, it is irradiated with ultraviolet rays by an ultraviolet rays radiation apparatus.

This ultraviolet rays radiation apparatus is provided with a metal halide lamp whose center wave-length is 365 nm and output is 200W, and a target area is irradiated by use of 2-branched optical fiber bundles 32 whose emitting diameter is about 5 mm. The luminance of the ultraviolet rays is 1500 to 2000 mW/cm$^2$ per single optical fiber. In the actual irradiation, two ultraviolet rays radiation apparatuses were used and the target area was irradiated in four directions (arranged at a 90° angular pitch). The ultraviolet rays were irradiated for about 10 seconds in a state as shown in FIG. 3, the resin housing 12 is horizontally placed, and the light emitting ends of the 2-branched optical fiber bundles 32 are set at positions horizontally spaced about 10 mm from the resin housing 12. During the ultraviolet rays irradiation, the resin housing 12 and the optical semiconductor element 14 are held with the fixing stage and the element holding tool 30 so as to maintain the aligned state.

Figure 4:
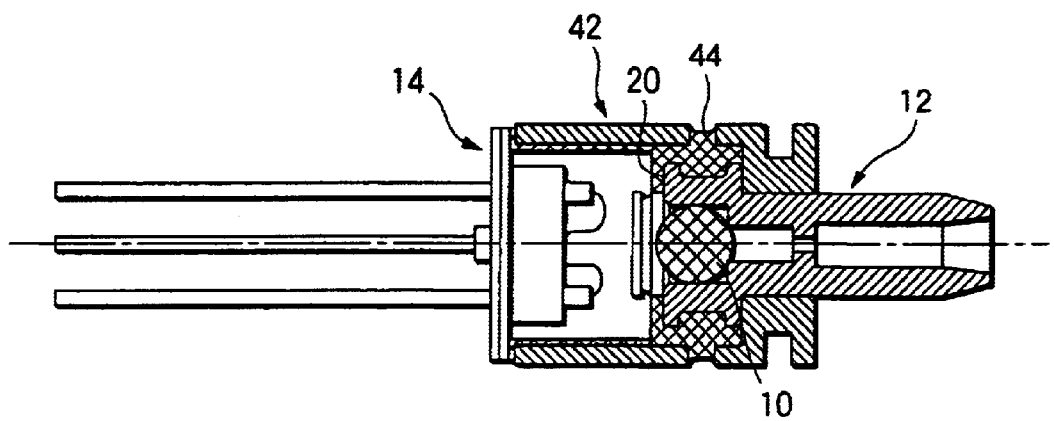
FIG. 4 is an explanatory diagram for explaining another embodiment of an optical module according to the present invention.

FIG. 4 is an explanatory diagram showing another embodiment of an optical module according to the present invention. In this embodiment, the optical module of the FIG. 1 embodiment is directly used as an optical module body, and hence like or equivalent portions are designated by like reference numerals in FIG. 1.

Figure 5:
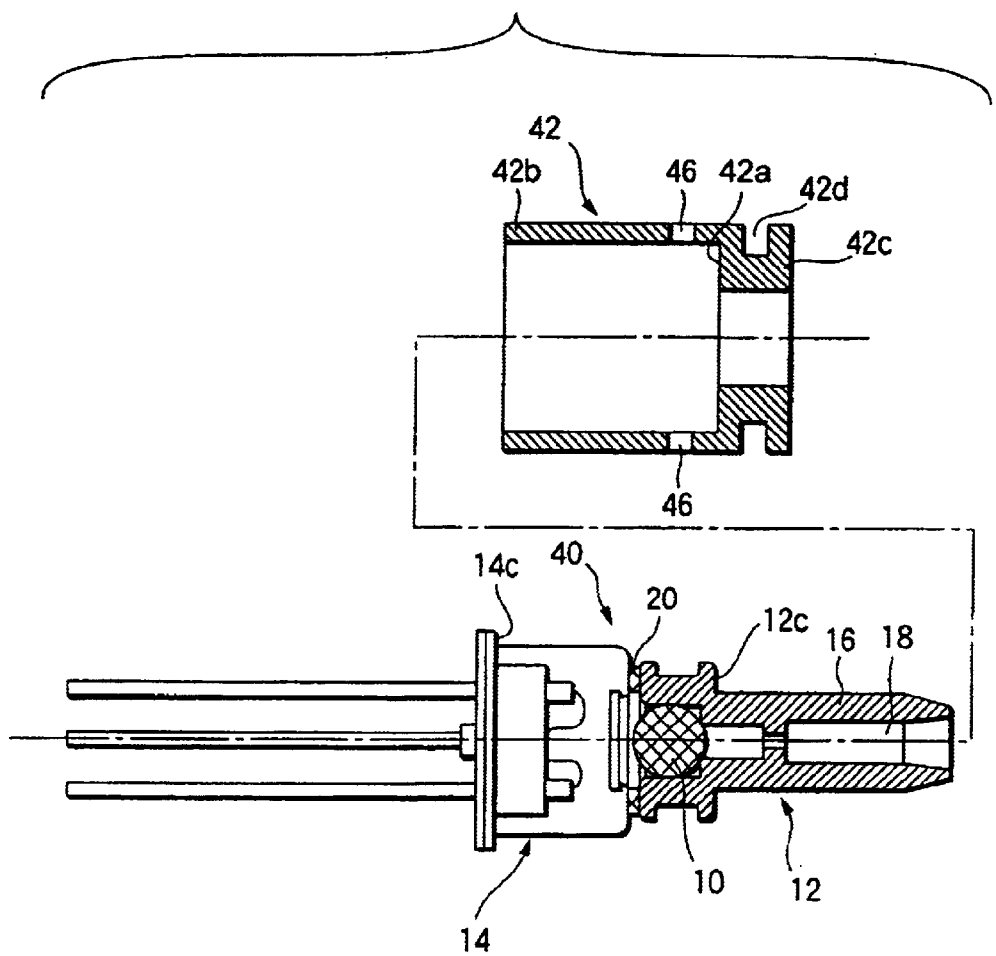
FIG. 5 is a diagram showing an assembly of the optical module of FIG. 4.
Figure 6:
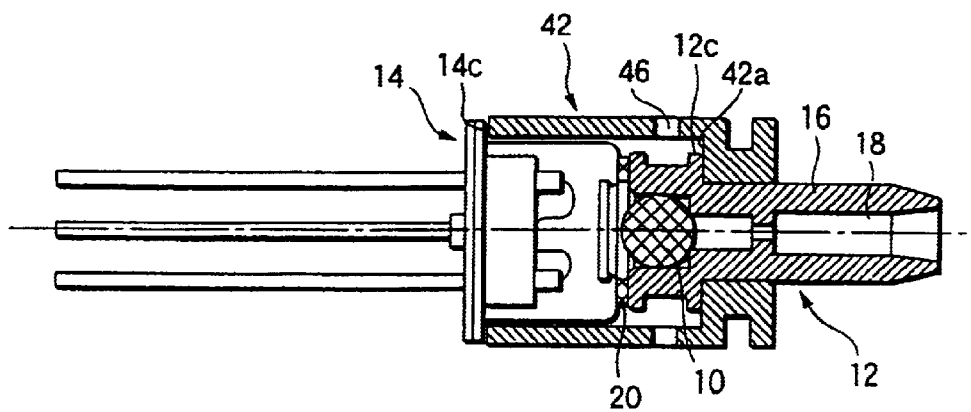
FIG. 6 is an explanatory diagram showing an optical module body being inserted into a resin housing.

In this embodiment, the side surface of the optical semiconductor element and at least a part of the side surface of the housing, which form an optical module body 40, are covered with a casing 42 made of resin, and a clearance therebetween is sealed with resin 44. As seen from an assembly explanatory diagram of FIG. 5, the casing 42 is almost tubular, and it includes a stepped part 42a formed on and along the inner circumference, a thin part 42b, a thick part 42c, those parts being continuous, and a groove 42d formed in and around the entire circumferential outer surface of the thick part 42c. The inner diameter of the thin part 42b is somewhat larger than the outer diameter of the cap of the optical semiconductor element 14. The inner diameter of the thick part 42c is almost equal to the outer diameter of the receptacle part 16 of the resin housing 12. A length of the thin part 42b is equal to or somewhat shorter than a distance from a position of a receptacle part end 12c of the resin housing 12 to a stem part 14c of the optical semiconductor element 14. When the optical module body 40 is covered with the casing 42 as shown in FIG. 6, the stepped part 42a is brought into contact with the receptacle part end 12c of the resin housing 12. Further, the circumferential inner surface of the thick part 42c is in close contact with the circumferential outer surface of the base part of the receptacle part 16. A slight clearance is present between the thin part 42b and the cap side surface of the optical semiconductor element 14. Some space is formed between the thin part 42b and the spherical-lens fixing part.

One or plural through-holes 46 (whose diameter is, for example, about 0.7 mm) which radially extend (equiangularly disposed in the circumferential direction) are preliminarily formed in the thin part 42b of the casing 42 at its portion facing the spherical-lens fixing part, in order to inject resin therethrough.

The optical module body 40 is put into the casing 42, and thermosetting epoxy resin (viscosity=15 Pa·s and Tg=110° C.) is injected, by use of needles, through the through-holes 46 formed in the casing side surface. Thereafter, the injected resin is subjected to a heat treatment at 100° C. and within 2 hours, thereby hardening the resin. The optical semiconductor element and the resin housing, which are fixed by the ultraviolet curing adhesive, are firmly coupled together as a whole by thermosetting epoxy resin 44 filled into the clearance for sealing.

That is, in the structure described above, the upper surface of the cap of the optical semiconductor element and the end face of the housing are bonded together by ultraviolet curing adhesive, and the clearance between the inner surface of the casing, and each of the side surface of the cap and at least a part of the side surface of the housing is sealed with thermosetting resin. Accordingly, the time taken for the bonding operation using the ultraviolet curing adhesive is extremely short. As a result, the coupling work of the optical optimal position is easy. With the sealing using the thermosetting resin, the bonding strength and the anti-weatherability are improved.

Figure 7:
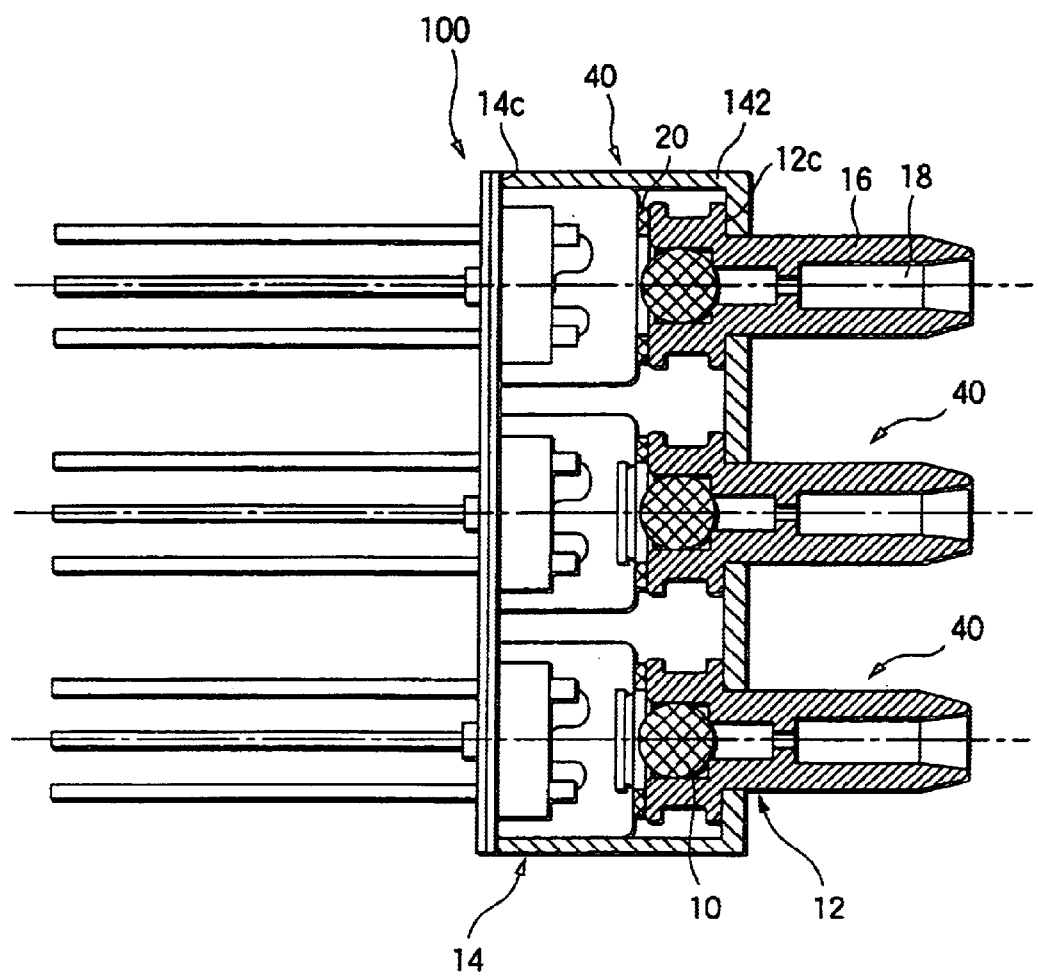
FIG. 7 is a diagram showing yet another embodiment of an optical module according to the present invention.

In another embodiment of the invention, a plurality of optical module bodies constructed as mentioned above are arranged in juxtaposition. Those optical module bodies thus arranged are covered with a single common casing, and a clearance is sealed with thermosetting resin. An example of this embodiment shown in FIG. 7, in which three optical module bodies 40 are juxtaposed on a common board 100, and covered with a common casing 142. The construction of this embodiment is typically applicable to an optical module of the tablet type in which semiconductor light emitting devices and semiconductor light receiving (detecting) devices are formed as sets in a single unit. This type of optical module may be realized by merely changing the structure of the casing.

In each embodiment, the ultraviolet curing adhesive is used for assembling the optical module body. It is evident that an appropriate adhesive or bonding method may be selectively used in accordance with materials of the component parts used. The same thing is true for the configuration and structure of the lens, and the structure of the lens fixing part. For example, as to the optical part, a gradient index rod lens, such as SELFOC lens, may be used in place of the spherical lens 10, Further, the optical part may be constructed by a plurality of optical components, such as a combination of lenses, a combination of the gradient index rod lens and a convex lens, a combination of the gradient index lens and a plano-convex lens or the like. The structure of the casing and the number of the optical module bodies arrayed are also optional.

As seen from the foregoing description, in the optical module of the invention, the end face of the housing is joined directly to the upper surface of the cap of the optical semiconductor element. Therefore, the optical module can be reduced in diameter. An optical module of 5.6 mm or smaller in outside diameter, which cannot be realized by the related art arrangement, can be realized. Therefore, the optical module of the invention is adaptable for the small optical connector of the LC or MU type.

The optical semiconductor element and the housing are joined together, and then those are independently assembled to the casing as the shell of the optical module. The invention is readily applied to the optical module of the tablet type. This leads to further size reduction of the optical module.

What is claimed is:

1. An optical module comprising:
    an optical semiconductor element sealed with a cap having an upper surface formed with a window;
    at least one optical part confronted with the window;
    a housing holding the optical part therein, and having an opened end face wherein an outer dimension of the opened end face of the housing is equal to or smaller than an outer dimension of the upper surface of the cap; and a connecting layer directly connecting the upper surface of the cap to the opened end face of the housing, wherein the connecting layer is formed by an adhesive.

2. The optical module according to claim 1, wherein the optical semiconductor element has a stem portion opposite from the upper surface of the cap, and an outer dimension of the opened end face of the housing is equal to or smaller than an outer dimension of the stem portion.

3. The optical module according to claim 1, wherein the optical semiconductor element has a stem portion opposite from the upper surface of the cap, and the stem portion is distanced from the opened end face of the housing.

4. The optical module according to claim 1, wherein the adhesive is curable by irradiation of ultraviolet rays.

5. The optical module according to claim 1, wherein the housing has a receptacle part adapted to receive a mating optical plug.

6. The optical module according to claim 1, further comprising:
   a casing, which at least partly covers the cap and the housing; and which extends across the connecting layer.

7. The optical module according to claim 7, further comprising:
   a sealing layer filled in a clearance between the casing, and the connecting layer, the sealing layer being formed by resin curable thermally.

8. An optical module in which an optical semiconductor element of the cap sealing type is mounted on a housing to be aligned with an optical axis of at least one optical part contained in the housing, wherein:
   an upper surface of a cap of said optical semiconductor element is bonded to an end face of said housing;
   a side surface of said cap of said optical semiconductor element and a side surface of said housing is a least partly covered with a casing, and a clearance therebetween is sealed with resin; and
   the upper surface of said cap of said optical semiconductor element and the end face of said housing are bonded by ultraviolet curing adhesive, and the clearance between the inner surface of said casing, and each of the side surface of said cap of said optical semiconductor element and the side surfaces of said housing is sealed with thermosetting resin.

9. The optical module of claim 8, in which an optical semiconductor element of the cap sealing type is mounted on a housing to be aligned with an optical axis of a lens contained in the housing adapted to fittingly receive and hold a ferule of an optical plug of an mating connecting member.

10. An optical module unit, comprising:
    a plurality of optical modules arrayed in juxtaposition and covered with a single common casing, each of said optical modules in said plurality semiconductor element of a cap sealing type mounted on a housing to be aligned with an optical axis of at least one optical part contained in the housing, wherein an upper surface of a cup of said optical semiconductor element is bonded to an end face of said housing; and
    a resin sealing a clearance between each of said optical modules.

11. An optical module unit, comprising:
    a plurality of optical modules arrayed in juxtaposition and covered with a single common casing, each of said optical modules in said plurality including an optical semiconductor element of a cap sealing type mounted on a housing to be aligned with an optical axis of a lens contained in a housing adapted to fittingly receive and hold a ferule of an optical plug of a mating connecting member, wherein an upper surface of a cap of said optical semiconductor element is bonded to an end face of said housing; and
    resin sealing a clearance between each of said optical modules.

* * * * *